(12) United States Patent
Yamauchi

(10) Patent No.: US 10,136,009 B2
(45) Date of Patent: Nov. 20, 2018

(54) IMAGE READING APPARATUS

(71) Applicant: CANON KABUSHIKI KAISHA, Tokyo (JP)

(72) Inventor: Tsuyoshi Yamauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/661,987

(22) Filed: Jul. 27, 2017

(65) Prior Publication Data

US 2018/0034987 A1 Feb. 1, 2018

(30) Foreign Application Priority Data

Jul. 29, 2016 (JP) .................................. 2016-149982

(51) Int. Cl.
| | | |
|---|---|---|
| *H04N 1/04* | (2006.01) | |
| *H04N 1/00* | (2006.01) | |
| *H04N 1/10* | (2006.01) | |
| *H04N 1/107* | (2006.01) | |

(52) U.S. Cl.
CPC ..... *H04N 1/00549* (2013.01); *H04N 1/00525* (2013.01); *H04N 1/04* (2013.01); *H04N 1/10* (2013.01); *H04N 1/107* (2013.01); *H04N 1/1026* (2013.01); *H04N 2201/0081* (2013.01)

(58) Field of Classification Search
CPC ............. H04N 1/00549; H04N 1/1026; H04N 2201/0081; H04N 2201/0082; H04N 2201/0091; H04N 2201/0093; H04N 2201/0094
See application file for complete search history.

(56) References Cited

U.S. PATENT DOCUMENTS

| | | | | |
|---|---|---|---|---|
| 6,026,261 A | * | 2/2000 | Peng | H04N 1/1017 358/497 |
| 6,050,388 A | * | 4/2000 | Gautherot | G07D 5/02 194/317 |
| 2002/0054380 A1 | * | 5/2002 | Takeuchi | H04N 1/031 358/498 |
| 2003/0197900 A1 | * | 10/2003 | Hiromatsu | H04N 1/0083 358/474 |
| 2007/0109562 A1 | | 5/2007 | Nagatani | |
| 2008/0074716 A1 | * | 3/2008 | Yoshihisa | H04N 1/00912 358/497 |
| 2008/0094018 A1 | | 4/2008 | Yoshihisa | |

FOREIGN PATENT DOCUMENTS

JP 2004-133151 A 4/2004

* cited by examiner

*Primary Examiner* — Moustapha Diaby
(74) *Attorney, Agent, or Firm* — Canon U.S.A., Inc. IP Division

(57) ABSTRACT

An image reading apparatus includes a sensor unit configured to move, a first driven pulley and a second driven pulley disposed apart from each other in a movement direction of the sensor unit, a drive pulley and a third driven pulley disposed between the first driven pulley and the second driven pulley in the movement direction, and a belt wound around the first driven pulley, the second driven pulley, the drive pulley, and the third driven pulley. The belt is bent at positions where each of the first driven pulley, the second driven pulley, and the drive pulley contacts an inner surface of the belt and is bent at a position where the third driven pulley contacts an outer surface of the belt.

11 Claims, 12 Drawing Sheets

IMAGE READING APPARATUS

BACKGROUND OF THE INVENTION

Field of the Invention

The present disclosure relates to an image reading apparatus configured to read an original document placed on a document platen.

Description of the Related Art

A flat-bed type image reading apparatus includes a document platen (document glass plate) configured to place an original document thereon, and a sensor unit (image sensor) configured to read the original document while scanning in a width direction of the original document at a position facing the original document via the document glass plate. In an image reading apparatus discussed in Japanese Patent Application Laid-Open No. 2004-133151, a tension pulley is disposed between a drive pulley and a driven pulley at both ends of a scan area, and a belt is wrapped around the drive pulley, the driven pulley and the tension pulley to form a triangular shape.

In a configuration of Japanese Patent Application Laid-Open No. 2004-133151, the apparatus is inevitably increased in size in a scan direction since a motor configured to drive the drive pulley is located outside the scan area. Further, since the belt is stretched in a triangular shape, a winding angle of the belt to each pulley (an angle at which each pulley contacts an inner surface of the belt) is small, and when strong impact is applied during a transportation of the apparatus, tooth jumping or falling off from the pulley of the belt may occur.

SUMMARY OF THE INVENTION

The present disclosure is directed to prevent tooth jumping or falling off from a pulley of a belt while reducing a size of an image reading apparatus.

According to an aspect of the present disclosure, an image reading apparatus includes a document platen on which an original document is placed, a sensor unit configured to read the original document while moving in a movement direction, a first driven pulley and a second driven pulley disposed apart from each other in the movement direction, a drive pulley and a third driven pulley disposed between the first driven pulley and the second driven pulley in the movement direction, a belt to which the sensor unit is attached and which is wound around the first driven pulley, the second driven pulley, the drive pulley, and the third driven pulley, and a motor configured to drive the drive pulley, wherein the belt is bent at positions where each of the first driven pulley, the second driven pulley, and the drive pulley contacts an inner surface of the belt and is bent at a position where the third driven pulley contacts an outer surface of the belt.

Further features of the present disclosure will become apparent from the following description of exemplary embodiments with reference to the attached drawings.

DESCRIPTION OF THE EMBODIMENTS

Figure 1:
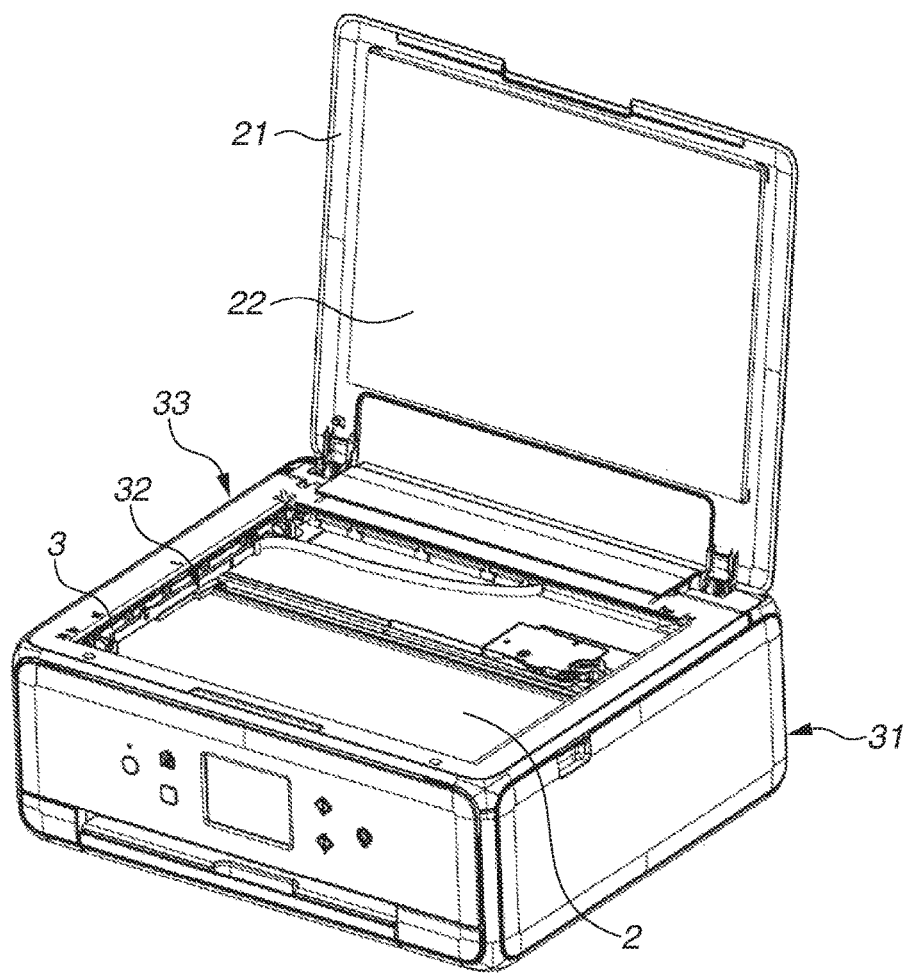
FIG. 1 is a perspective view of an image reading apparatus according to an exemplary embodiment of the present disclosure.

An exemplary embodiment of the present disclosure will be described below. The same reference numerals are given to the same or corresponding parts in the figures.

Figure 2:
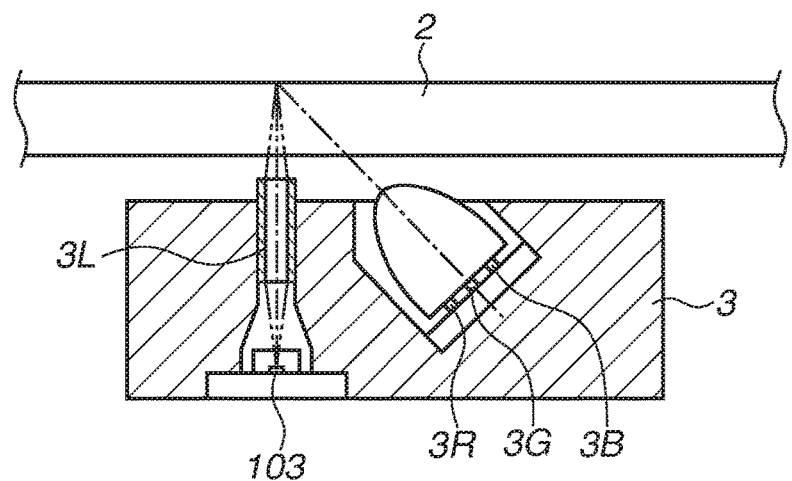
FIG. 2 is a cross-sectional view around an image read sensor.

An overall configuration of an image reading apparatus according to an exemplary embodiment of the present disclosure will be described with reference to FIGS. 1 and 2. FIG. 1 is a perspective view of the image reading apparatus according to the present exemplary embodiment, and FIG. 2 is a cross-sectional view illustrating an image read sensor. As illustrated in FIG. 1, the image reading apparatus 31 includes a printer unit configured to print an image and a flat-bed type image read unit 33 (scanner unit) disposed on the printer unit. Note that the present exemplary embodiment can also be applied to an image reading apparatus including a single-function scanner without a printer unit.

On an upper surface of a housing of the image read unit 33, a document glass plate 2 including a transparent glass plate is provided as a document platen configured to place an original document to be read thereon. A sensor unit 32 facing the original document via the document glass plate 2 is disposed inside the housing. The sensor unit 32 performs scan movement in parallel with the document glass plate 2, and includes an image read sensor 3.

As illustrated in FIG. 2, the image read sensor 3 includes three light-emitting diodes (LEDs) 3R, 3G, and 3B of different colors as light sources for original document irradiation, an image sensor 103 (charge-coupled device (CCD) sensor, complementary metal oxide semiconductor (CMOS) sensor, and the like), and a rod lens array 3L. The rod lens array 3L forms an image on a light receiving element of the image sensor 103 with a reflected light from the original document. The image read sensor 3 can perform color separation reading by sequentially switching and turning on the LEDs 3R, 3G, and 3B of three colors, and for each color, reading, by the image sensor 103, a light which has been reflected by the original document and passed through the rod lens array 3L. As illustrated in FIG. 1, a document cover 21 serving as a document pressing member for pressing the original document onto the document glass plate 2 is openably attached above the image read unit 33. A document pressing sheet 22 including a sheet material and a sponge is stuck on an inner surface of the document cover 21 facing the document glass plate 2.

Figure 3:
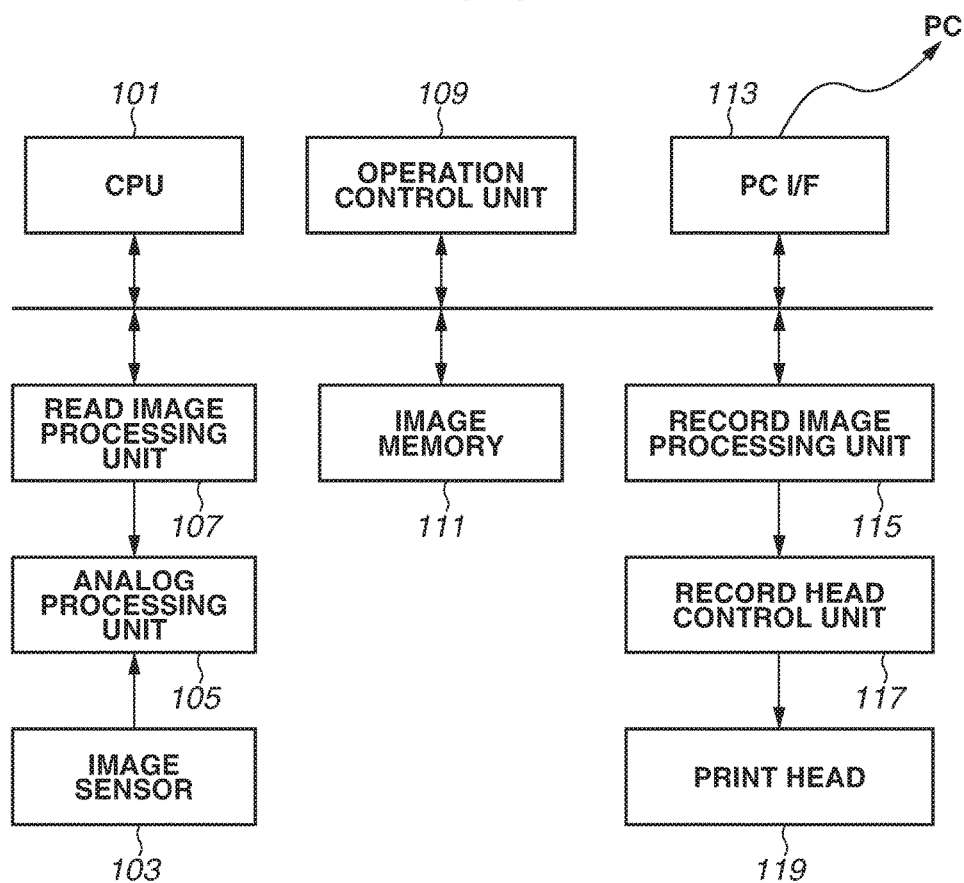
FIG. 3 is a block diagram illustrating a control configuration.

FIG. 3 is a block diagram illustrating a control configuration of the image reading apparatus 31. A read image processing unit 107 is connected to a central processing unit (CPU) 101 configured to control entire apparatus. An analog processing unit 105 is connected to the read image processing unit 107. The image sensor 103 is connected to the analog processing unit 105. The image sensor 103 is an image sensing element configured to read image data. The analog processing unit 105 amplifies and samples an analog image signal output from the image sensor 103, and performs analog to digital (A/D) conversion to output digital image data. The read image processing unit 107 performs image processing such as edge emphasis and color conversion on the digital image data output from the analog processing unit 105. The image sensor 103, the analog processing unit 105, and the read image processing unit 107 realize a scanner function of reading the original document. In a multi-function peripheral of the present exemplary embodiment, while the sensor unit 32 including the light sources 3R, 3G, and 3B and the image sensor 103 of a line type illustrated in FIG. 2 is performing scan movement, the light sources 3R, 3G, and 3B irradiate the original document with light, and the image sensor 103 reads the reflected light. In this way, a scan operation is realized.

A record image processing unit 115 is connected to a personal computer (PC) interface (I/F) 113. A record head control unit 117 is connected to the record image processing unit 115. A print head 119 is connected to the record head control unit 117. The record image processing unit 115 executes quantization processing and the like for changing a size of image data to be recorded or matching the specification of the image data to that of the print head 119. The record head control unit 117 converts the image data output from the record image processing unit 115 into a format corresponding to the print head 119 to generate a head drive signal. The print head 119 is an inkjet type liquid ejection head configured to eject liquid ink toward a record medium according to the head drive signal to perform recording. Note that a type of the liquid ejection head is not limited to the inkjet type, and other printing types may be adopted. The printer unit (an image recording unit) is configured as described above.

The PC I/F 113, an image memory 111, and an operation control unit 109 are connected to the CPU 101. The PC I/F 113, serving as a connection unit with a PC (not illustrated), transmits read image data to the PC in scanning, and receives the image data and control data from the PC in printing. The image memory 111 temporarily stores the read image data and image data to be recorded. The operation control unit 109 includes a key input unit and a display unit, and functions as a user interface with which a user instructs operations such as selection of a mode including a copy mode and a scan mode, and start of operation.

With such a configuration, in the image reading apparatus 31 of the present exemplary embodiment, a scan operation and a print operation are executed based on the user's operation in the operation control unit 109 or a signal (data) supplied from the PC via the PC I/F 113. In the scan operation, the original document is read by the scan movement of image sensor 103, and the read image data is processed by the analog processing unit 105 and the read image processing unit 107, to output the processed image data to the PC via the PC I/F 113. In the print operation, the image data to be recorded is processed by the record image processing unit 115 and the record head control unit 117, and then supplied to the print head 119, and the print head 119 ejects the liquid ink to the record medium to from (record) an image. The image memory 111 is used when it is necessary to temporarily store the data during the scan operation and print operation is necessary.

Figure 4:
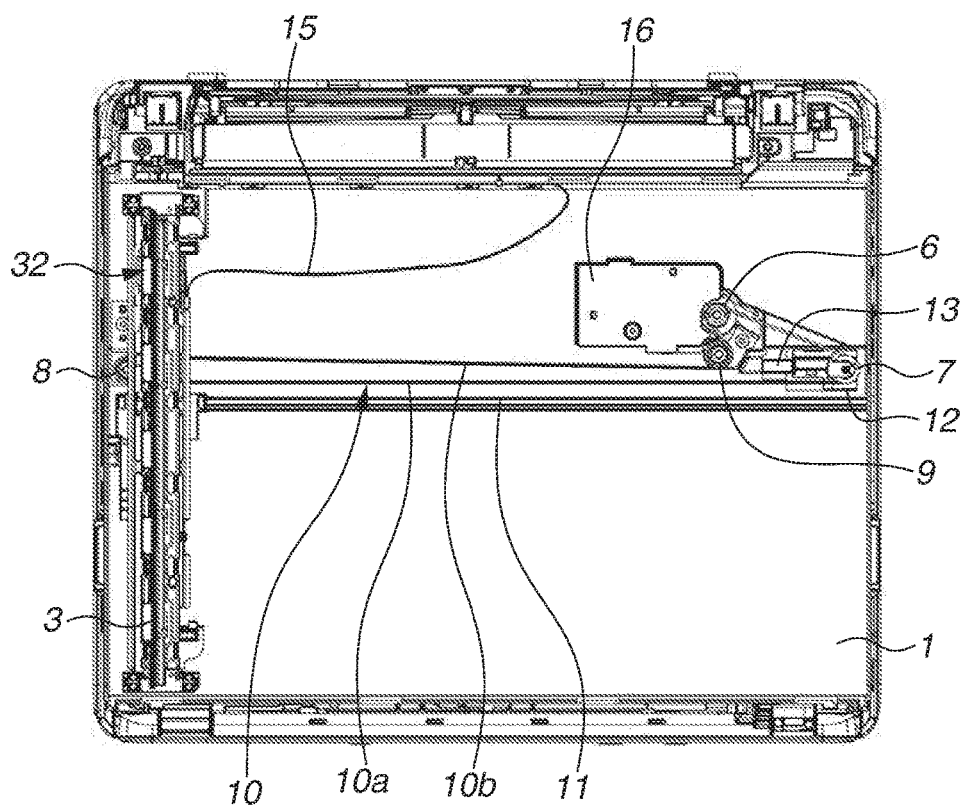
FIG. 4 is a plan view in which some members of the image reading apparatus are omitted.
Figure 5:
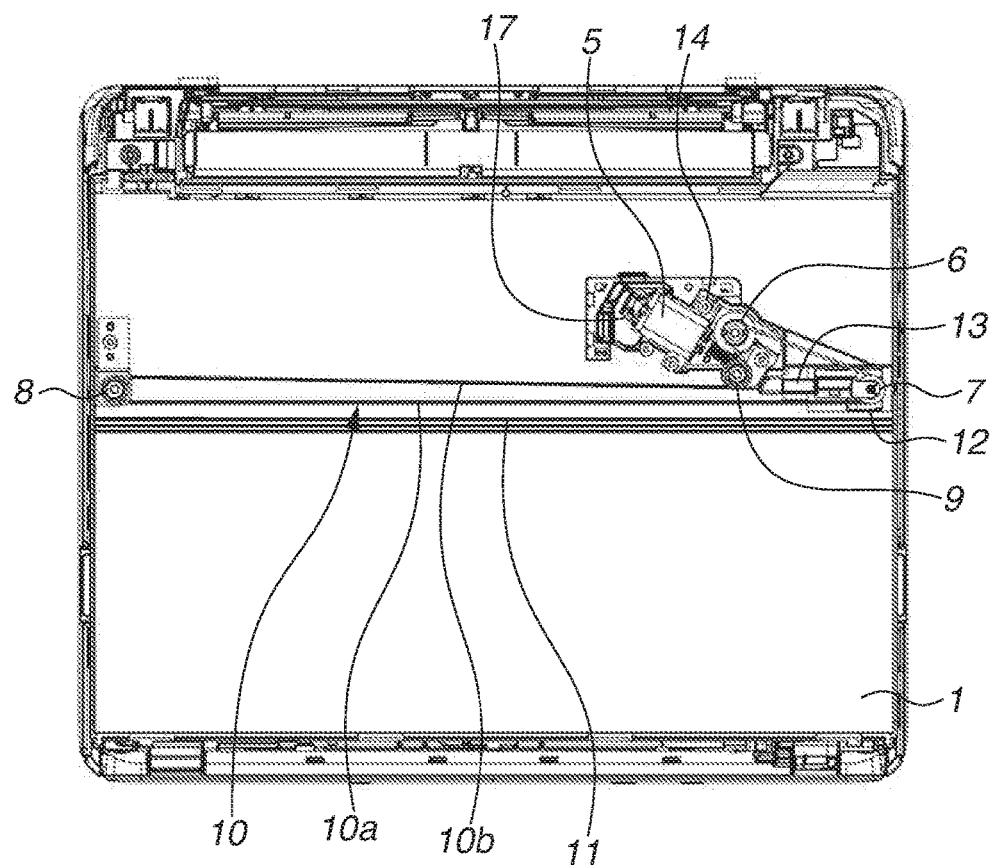
FIG. 5 is a plan view in which some other members of the image reading apparatus illustrated in FIG. 4 are omitted.
Figure 6:
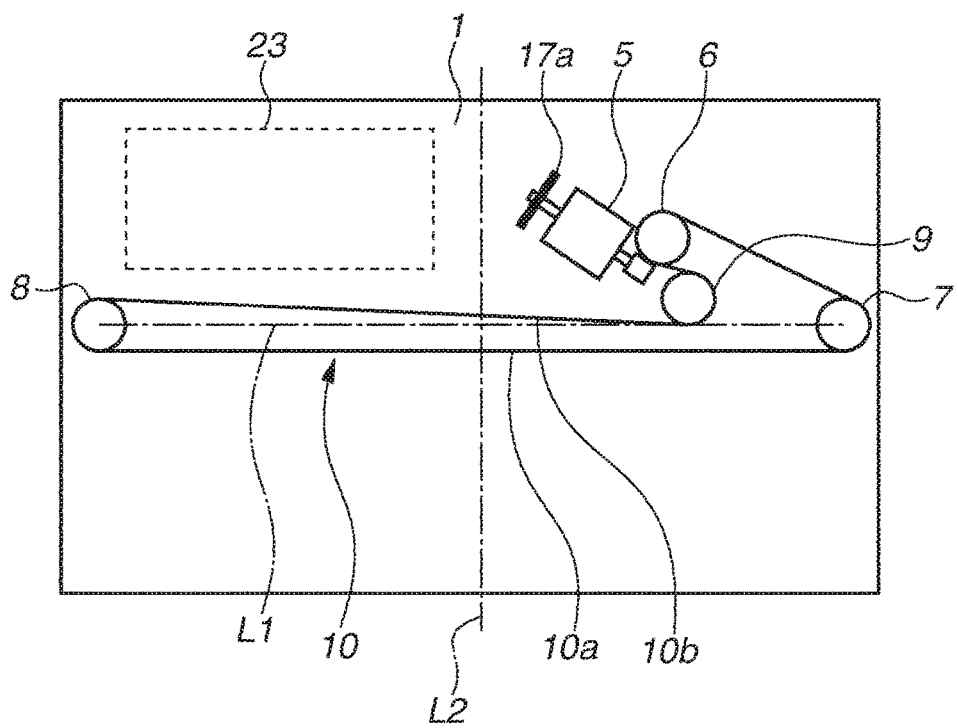
FIG. 6 is a schematic plan view illustrating a positional relationship among a motor, a belt and a pulley.

Next, a configuration of the image read unit 33 will be described. FIG. 4 is a plan view of the image reading apparatus viewed from above, in which the document cover 21, the document glass plate 2, a platen holding member 4 (see FIG. 7) configured to hold the document glass plate 2, and the like are removed so that inside of the image read unit 33 can be seen easily. FIG. 5 is a plan view of the apparatus viewed from above, in which the sensor unit 32, a motor cover 16, and the like are removed so that a movement mechanism can be seen more easily. FIG. 6 is a plan view of the apparatus viewed from above, in which a positional relationship among main parts such as a motor 5, a belt 10, and pulleys 6 to 9 is schematically illustrated for better understanding.

In the image read unit 33, a sensor unit 32 is disposed below the document glass plate 2 on which the original document is placed, and performs scan movement between one end and the other end in a width direction of the original document. Simultaneously with this scan movement, light is emitted from the LEDs 3R, 3G, and 3B and received by the image sensor 103 as illustrated in FIG. 2, to read the original document. A movement mechanism for the scan movement of the sensor unit 32 will be described below.

In the present exemplary embodiment, the sensor unit 32 is attached to a part of the belt 10, and along with circulation of the belt 10, the sensor unit 32 reciprocates along a guide rail 11 at a position facing the original document via the document glass plate 2. The belt 10 is wound around the four pulleys 6, 7, 8, and 9. As illustrated in FIGS. 4 and 5, a spring 13 configured to apply a certain tension to the belt 10 is attached to a first driven pulley 7 via a tension holder 12. Due to the spring 13, the belt 10 can be circulated without loosening, and the sensor unit 32 can accurately perform scan movement.

An inner surface of the closed looped belt 10 (a belt inner surface) is partially wound around each of the three pulleys 6, 7, and 8, and an outer surface of the belt 10 (a belt outer surface) is partially wound around the one pulley 9. In addition, one of the pulleys contacting the inner surface of the belt 10 is the drive pulley 6, the other two are the first driven pulley 7 and the second driven pulley 8, and the pulley contacting the outer surface of the belt 10 is the third driven pulley 9. The first driven pulley 7 and the second driven pulley 8 are disposed at both ends of the scan area of the sensor unit 32. Note that "end" as used herein means a portion including an edge and vicinity thereof.

The drive pulley 6 and the third driven pulley 9 are provided near to each other between the first driven pulley 7 and the second driven pulley 8 in the scan direction (movement direction of the sensor unit 32) in which the sensor unit 32 performs scan movement. In the scan direction of the sensor unit 32, the drive pulley 6 is positioned between the first driven pulley 7 and the second driven pulley 8, and the third driven pulley 9 is positioned between the first driven pulley 7 and the drive pulley 6. The belt 10 is wound around the first driven pulley 7, the drive pulley 6, the third driven pulley 9, and the second driven pulley 8 in this order from a side of the first driven pulley 7. Although not illustrated, the third driven pulley 9 may be positioned between the second driven pulley 8 and the drive pulley 6. In that case, the left and right of FIG. 6 are inverted. In either case, since the drive pulley 6 and the third driven pulley 9 contact the inner surface and the outer surface of the belt 10, respectively, the pulleys 6 and 9 rotate in opposite directions to each other.

As illustrated in FIG. 5, the motor 5 serving as a drive source of the belt 10 is fixed to a motor holder 14 in the horizontally placed posture so that a shaft (motor shaft) extends in a direction parallel to the document glass plate 2. The drive pulley 6 and the third driven pulley 9 are rotatably attached to the motor holder 14. The motor 5, the drive pulley 6, and the third driven pulley 9 are positioned in the scan area of the sensor unit 32. A gear (which may be a worm gear or a bevel gear) is attached to the shaft of the motor 5 and connected to the drive pulley 6 to which driving force of the motor 5 is transmitted. On the other hand, the first to third driven pulleys 7 to 9 are rotatably provided and driven to rotate following the circulation of the belt 10. A gear is attached to one end side of the motor shaft of the motor 5, and a code wheel 17a is attached to the other end side of the motor shaft across a motor body. In addition, an encoder 17 configured to read a slit of the code wheel 17a is provided. A signal of the encoder 17 is electrically connected to a control board 23 (see FIG. 10) described below. The rotation of the motor 5 is controlled by the control board 23 based on a detection result of the encoder 17. The gear of the motor 5 is disposed between the drive pulley 6 and the third driven pulley 9. This configuration is effective for reducing a space for the motor holder 14 configured to fix the motor 5, the drive pulley 6, and the third driven pulley 9, and enables size reduction of a lower housing unit 1a (see FIG. 9) described below. Accordingly, the motor cover 16 (see FIG. 4) configured to cover an upper portion (a portion facing the document platen) of a drive unit including the motor 5 and the drive pulley 6 can also be reduced in size to prevent a flexible flat cable 15 moving together with the sensor unit 32 from contacting the drive unit. The position of the gear of the motor 5 between the drive pulley 6 and the third driven pulley 9 also contributes to a smooth movement of the flexible flat cable 15. Furthermore, the installation of the motor 5 in the horizontally placed posture also contributes to size reduction of the apparatus in a height direction and flexibility in layout in the apparatus. As described above, the motor shaft has a long dimension across the motor body, and the gear and the code wheel 17a are attached to both ends of the motor shaft. If the motor 5 is installed in a vertically placed posture, a lower end of the long motor shaft (code wheel 17a) deeply enters into a printer unit side, which restricts layout in the apparatus.

As schematically illustrated in FIG. 6, when viewed from above, the looped belt 10 includes a pair of inter-vehicle portions 10a and 10b extending between the first driven pulley 7 and the second driven pulley 8. One inter-vehicle portion 10a linearly extends between the first driven pulley 7 and the second driven pulley 8. The other inter-vehicle portion 10b is bent between the first driven pulley 7 and the second driven pulley 8 since the drive pulley 6 and the third driven pulley 9 contact the belt inner surface and the belt outer surface, respectively. The third driven pulley 9 that contacts the belt outer surface of the other inter-vehicle portion 10b is positioned near the one inter-vehicle portion 10a. The drive pulley 6 positioned farther away from the one inter-vehicle portion 10a than the third driven pulley 9 is positioned nearer to a center side in the scan direction of the sensor unit 32 than the third driven pulley 9. In other words, the third driven pulley 9 is positioned nearer than the drive pulley 6 to a horizontal line L1 connecting rotation centers of the first driven pulley 7 and the second driven pulley 8. The rotation center of the third driven pulley 9 is located farther away than the rotation center of the drive pulley 6 from a vertical line L2 passing through a center of the scan area of the sensor unit 32 in the scan direction and orthogonal to the scan direction. In such a disposition, the other inter-vehicle portion 10b is wound around the third driven pulley 9 at a position near the one inter-vehicle portion 10a and away from the center in the scan direction, then pulled back to the center side in the scan direction, and wound around the drive pulley 6 positioned away from the one inter-vehicle portion 10a. That is, the belt 10 is bent substantially in a zigzag shape (pseudo-Z shape) between the drive pulley 6 and the third driven pulley 9.

In other words, a positional relationship between the drive pulley 6 and the third driven pulley 9 in the scan direction of the sensor unit 32 and the order in which the belt 10 is wound are reversed between the first driven pulley 7 and the second driven pulley 8. That is, when viewed from the side of the first driven pulley 7 in the example illustrated in FIG. 6, the third driven pulley 9 and the drive pulley 6 are positioned in this order in the scan direction, whereas the belt 10 is wound in the order of the drive pulley 6 and the third driven pulley 9. Accordingly, the belt 10 is bent substantially in a zigzag shape (pseudo-Z shape) between the drive pulley 6 and the third driven pulley 9. Note that, in FIG. 6, the rotation center of the third driven pulley 9 is positioned at an outer side than the rotation center of the drive pulley 6 when viewed from the vertical line L2 in the scan direction. However, the present exemplary embodiment is not limited to such a configuration, and both of the rotation centers of the third driven pulley 9 and the drive pulley 6 may be disposed at substantially the same distance from the vertical line L2 in the scan direction. Also with this configuration, sufficient bending of the belt 10 can be obtained. Alternatively, the positional relationship between the rotation centers may be slightly reversed. Further, as a modification which is not illustrated, when viewed from the side of the first driven pulley 7, the drive pulley 6 and the third driven pulley 9 may be placed in this order in the scan direction, whereas the belt 10 may be wound in the order of the third driven pulley 9 and the drive pulley 6. Also in this case, the belt 10 is bent substantially in a zigzag shape (pseudo-Z shape) between the drive pulley 6 and the third driven pulley 9.

As described above, when the belt 10 is bent substantially in a zigzag shape between the drive pulley 6 and the third driven pulley 9, the belt 10 is wound around each of the drive pulley 6 and the first to third driven pulleys 7 to 9 at a winding angle of about 180° or more. As a result, risks such as tooth jumping and falling off from the pulleys 6 to 9 of the belt 10 are reduced at the time of scan movement of the sensor unit 32 and transportation of the image reading apparatus 31.

However, the present exemplary embodiment is not limited to the configuration in which the positional relationship between the drive pulley 6 and the third driven pulley 9 and the order in which the belt 10 is wound are reversed. The present exemplary embodiment may also adopt another configuration since the winding angle at which the belt 10 is wound around each of the pulleys 6 to 9 is increased to some extent, as long as the drive pulley 6 and the third driven pulley 9 contact the belt inner surface and the belt outer surface, respectively, so that the belt is bent between the first driven pulley 7 and the second driven pulley 8. Also with this configuration, risks such as tooth jumping and falling off from the pulleys 6 to 9 of the belt 10 are reduced.

As described above, the third driven pulley 9 is disposed near the straight line (the one inter-vehicle portion 10a) connecting the first driven pulley 7 and the second driven pulley 8 arranged at both ends of the scan area. In this configuration, a portion of the other inter-vehicle portion 10b of the belt 10 extending between the second driven pulley 8 and the third driven pulley 9 is substantially parallel to the one inter-vehicle portion 10a, and area occupied by the belt 10 and the pulleys 6 to 9 is reduced in the scan area of the sensor unit 32. Accordingly, since a possibility that the belt 10 and the drive unit (including the drive pulley 6 and the motor 5) interfere with the flexible flat cable 15 or the like and hinder the movement is reduced, the flexibility of disposition of other members and the like is increased, and this configuration contributes to size reduction of the image reading apparatus 31.

Further, as illustrated in FIG. 6, the motor 5 is installed in the horizontally placed posture, and a direction of the motor shaft is parallel to a surface of the document glass plate and inclined to the scan direction. More specifically, an end side of the motor shaft to which the code wheel 17a is attached is inclined to be nearer to the center in the scan direction than an end side to which the gear is attached. Further, when viewed from above, the direction of the motor shaft is nearly parallel to a line connecting the rotation center of the first driven pulley 7 and the rotation center of the drive pulley 6. In addition, the direction of the motor shaft is nearly parallel to a direction in which the belt 10 is stretched between the first driven pulley 7 and the drive pulley 6. As used herein, "nearly parallel" means a range in which a relative angular difference between the two is 30 degrees or less. By disposing the motor 5 horizontally and obliquely relative to the scan direction in this way, a drive system including the motor 5, the drive pulley 6, the third driven pulley 9 and the encoder 17 is concentrated in a small area when viewed from above. Furthermore, such a disposition of the motor 5 realizes a compact configuration in which a downward projection of the drive system is reduced also in the height direction.

Furthermore, as illustrated in FIG. 6, when viewed from above, the motor 5, the drive pulley 6, and the third driven pulley 9 are positioned in one half of the scan area of the sensor unit 32 (a right half area of the vertical line L2 in FIG. 6). Below the other half of the area (a left half area of the vertical line L2), the control board 23 of the image reading apparatus 31 is horizontally installed as described below. In this way, a degree of integration of the entire apparatus is improved without physical interference between the projection of the drive system of the scanner and the control board 23.

As described above, in a configuration of the present exemplary embodiment, the first and second driven pulleys 7 and 8 are disposed at both ends of the scan area of the sensor unit 32, and the drive unit including the drive pulley 6 and the third driven pulley 9 are not disposed near the end of the scan area. With this configuration, the motor 5 serving as the drive source can be disposed so as not to project outside the scan area of the sensor unit 32. As a result, a dimension (width) of the image read unit 33 in the scan direction can be made substantially equal to a width of the scan area of the sensor unit 32, which greatly contributes to size reduction of the image read unit 33.

Here, as one virtual mode, a mode is considered in which only the drive pulley 6 is provided between the first and second driven pulleys 7 and 8, and the third driven pulley 9 is not provided. In this mode, it is necessary to increase the winding angle at which the belt 10 is wound around the drive pulley 6 to prevent the tooth jumping of and falling off from the pulleys 6 to 9 the belt 10. For this purpose, the drive pulley 6 needs to be disposed at a position far away from the one inter-vehicle portion 10a. As a result, when viewed in a plan view from above the document glass plate 2, the area occupied by the belt 10, the drive unit, and the like increases, which impose a serious restriction on disposition and movement of other members (for example, movement of the flexible flat cable 15 accompanying movement of the sensor unit 32). In particular, when the drive unit including the drive pulley 6 is located at the center of the scan area of the sensor unit 32, it is necessary to dispose the other members avoiding the drive unit to provide a movement path of the other members so as not to be interfered by the drive unit, which is a serious design constraint. Additionally, as another virtual mode, a mode is considered in which the third driven pulley 9 and the drive pulley 6 are omitted, and either one of the first and second driven pulleys 7 and 8 is a drive pulley. In this mode, as the drive pulley is positioned at the end of the apparatus, the drive system is placed at the end of the apparatus, which is a constraint on size reduction of the apparatus in the direction of scan movement of the sensor unit 32.

Accordingly, in the present exemplary embodiment, the third driven pulley 9 is disposed near the drive pulley 6 and contacts the surface (belt outer surface) opposite to the surface (belt inner surface) contacting the drive pulley 6 of the belt 10. With this configuration, the belt 10 is bent in a zigzag shape (Z shape) between the drive pulley 6 and the third driven pulley 9. As a result, even if the drive unit (including the drive pulley 6 and the motor 5) and the third driven pulley 9 are disposed near the one inter-vehicle portion 10a of the belt 10, the angle at which the belt 10 is wound around the drive pulley 6 and the third driven pulley 9 is large, and tooth jumping and falling off from the pulleys 6 to 9 of the belt 10 can be prevented. That is, there is no need to take tooth jumping and falling off from the pulleys 6 to 9 of the belt 10 into account, the area occupied by the belt 10, the drive unit, and the like when viewed in a plan view from above the document glass plate 2 can be reduced, and constraints on disposition and movement of the other members can be reduced. This contributes to size reduction of the image read unit 33.

Figure 7:
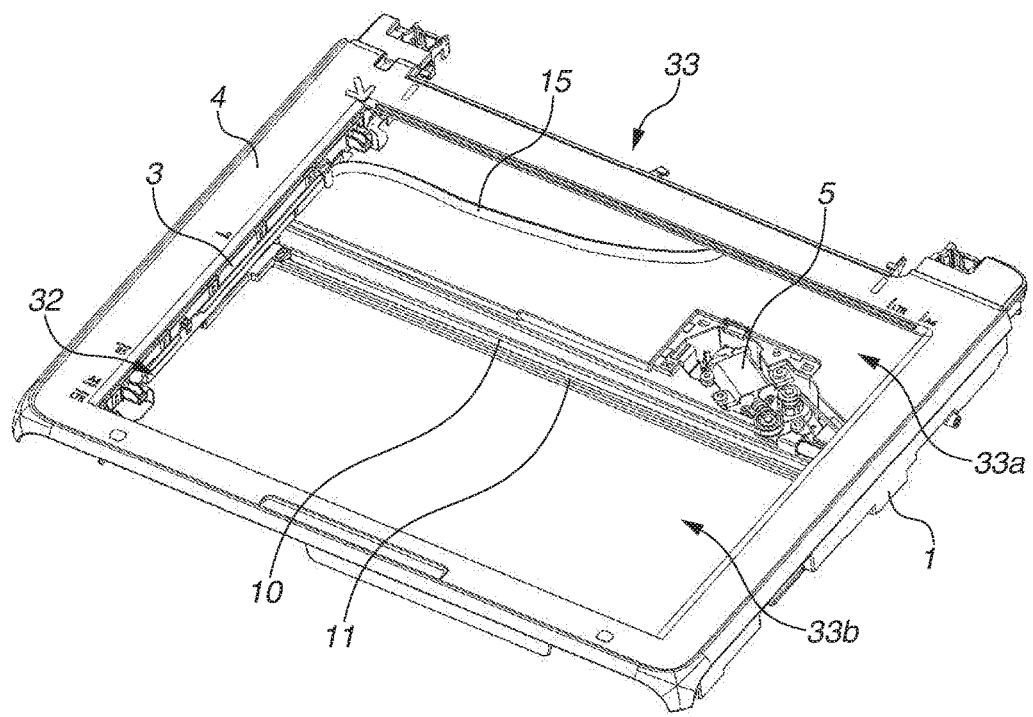
FIG. 7 is a perspective view of a main part of the apparatus.
Figure 10:
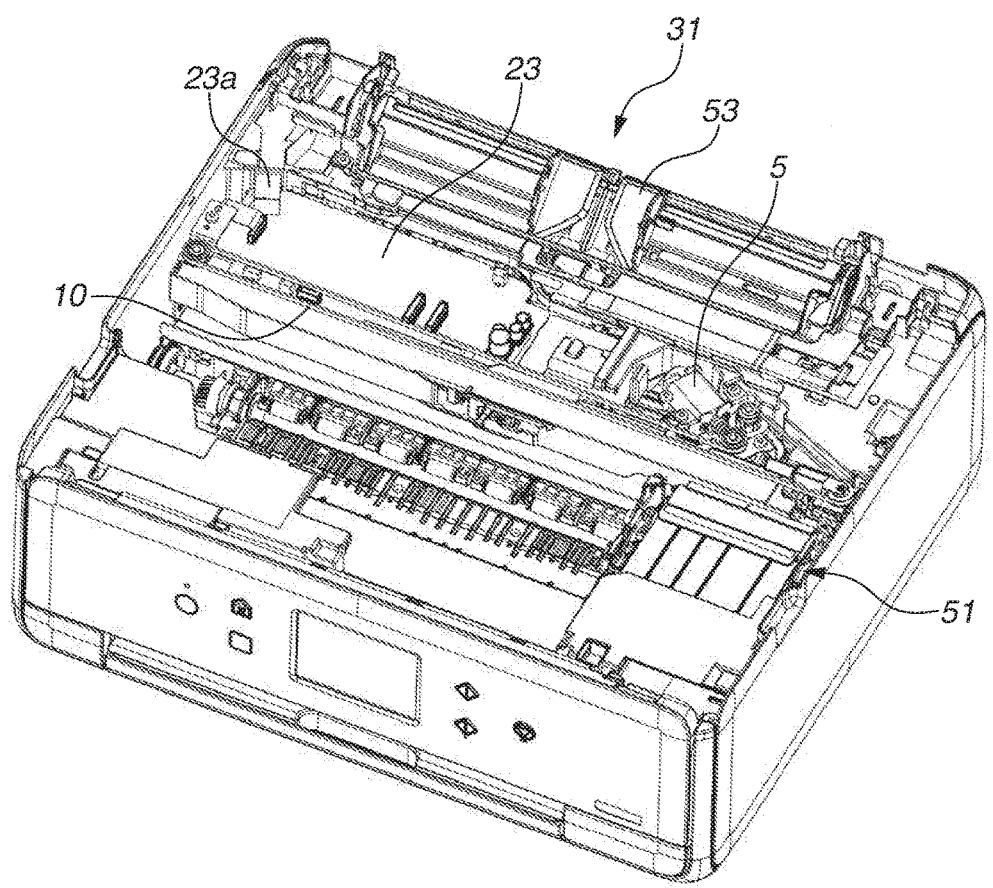
FIG. 10 is a perspective view in which some members of the apparatus are omitted.

FIG. 7 is a perspective view in which some parts of the image read unit 33 of the present exemplary embodiment are omitted. As described above, the sensor unit 32 including the image read sensor 3 performs scan movement along the guide rail 11 provided in a base member 1. The flexible flat cable 15 electrically connected to the control board 23 which is illustrated in FIG. 10 and described below is disposed perpendicular to the document glass plate 2. During the scan movement of the sensor unit 32, the flexible flat cable 15 moves in the image read unit 33 while flexibly deforming according to the movement of the image read sensor 3. When the image read unit 33 is divided into two areas 33a and 33b by the guide rail 11 extending in the scan direction of the sensor unit 32, the flexible flat cable 15 is located in the same area 33a as the drive unit (including the drive pulley 6 and the motor 5) and moves within the area 33a. The flexible flat cable 15 is folded in two in the width direction thereof to reduce the dimension of the image read unit 33 in the height direction, in the area 33a where the flexible flat cable 15 is positioned.

Figure 8:
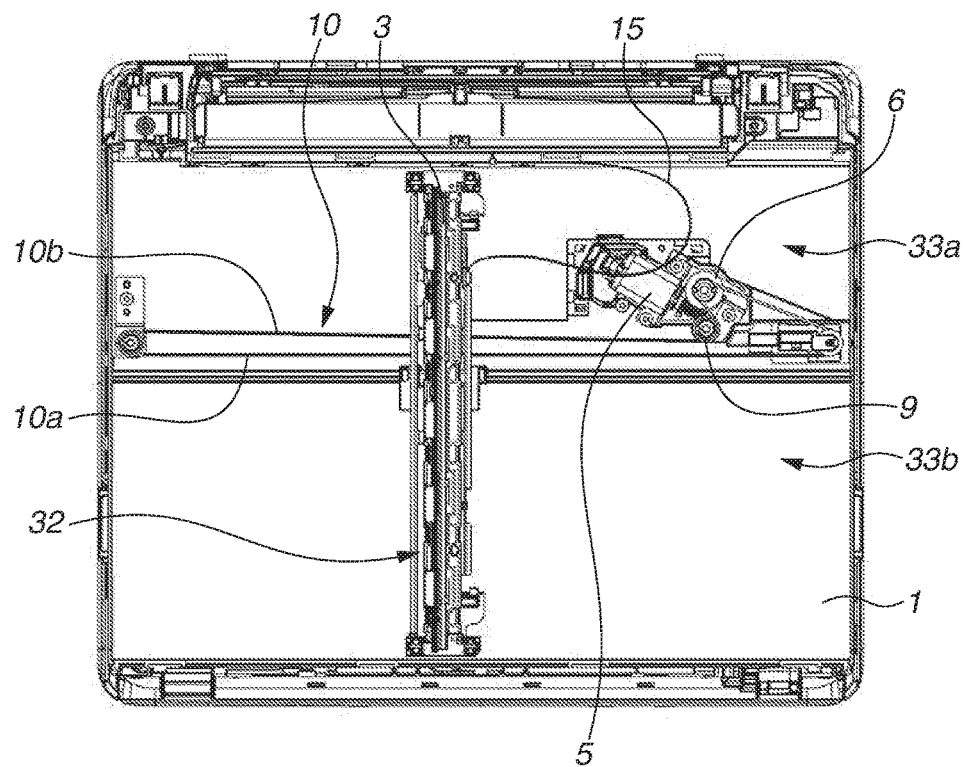
FIG. 8 is a plan view in which some members of the apparatus are omitted.

FIG. 8 is a plan view in which some parts of the image read unit 33 are omitted when the sensor unit 32 is moved to near the center in the scan direction. As can be seen from FIG. 8, the flexible flat cable 15 passes over the drive unit (including the motor 5 and the drive pulley 6) and the third driven pulley 9 covered with the motor cover 16 (see FIG. 4). At this time, the flexible flat cable 15 can move without contacting the drive pulley 6, the third driven pulley 9, the motor 5, the code wheel 17a, and the like. The area 33a, except for the portion where the drive unit is positioned, is only required to have a thickness in the height direction substantially equal to a height of the sensor unit 32 performing scan movement or a width of the folded flexible flat cable 15, whichever is larger. On the other hand, the other area 33b where the drive unit and the flexible flat cable 15 are not disposed is only required to have a thickness substantially equal to that of the sensor unit 32 performing scan movement. Accordingly, particularly by folding the flexible flat cable 15 in two, size reduction of the image read unit 33 can be achieved.

Figure 9:
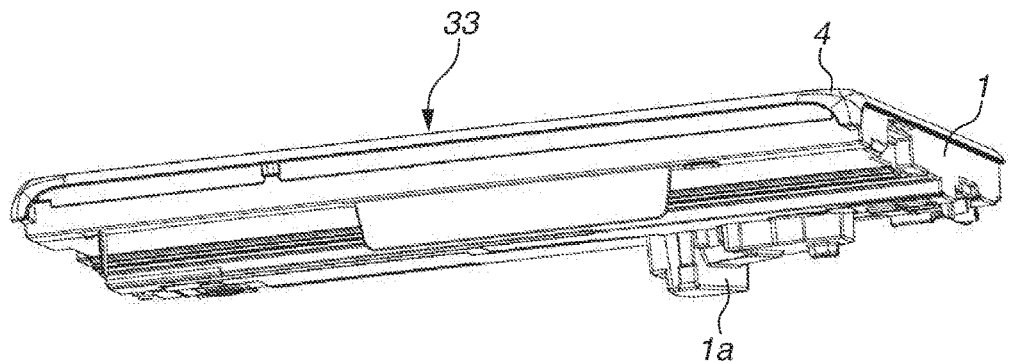
FIG. 9 is a perspective view of the apparatus viewed from below.

FIG. 9 is a perspective view of the image read unit 33 as viewed from slightly below. FIG. 9 illustrates the lower housing unit 1a of the drive unit arranged in the scan area of the sensor unit 32. The lower housing unit 1a is a portion protruding downward from the base member 1 and configured to dispose the drive unit downward so as not to interfere with the flexible flat cable 15 and the like. The lower housing unit 1a is relatively small as illustrated in FIG. 9, and the dimension (thickness) of the image read unit 33 in the height direction can be made substantially equal to the thickness of the sensor unit 32.

Figure 11:
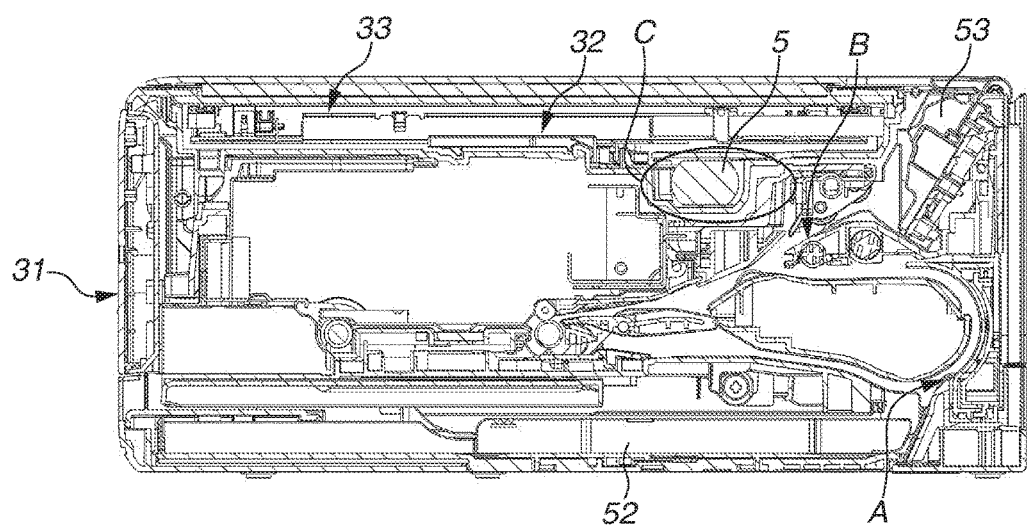
FIG. 11 is a side cross-sectional view of the apparatus.
Figure 12:
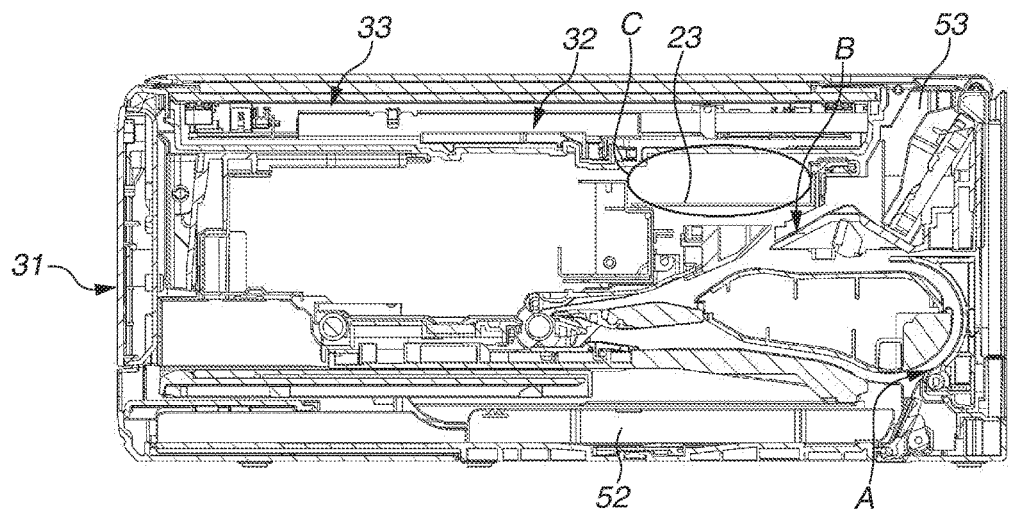
FIG. 12 is a side cross-sectional view of the apparatus cut at a position different from that of FIG. 11.

FIG. 10 is a perspective view in which portions in the image read unit 33 other than the drive unit (including the motor 5 and the drive pulley 6), the belt 10, and the first to third driven pulleys 7 to 9 are omitted so that the image reading apparatus 31 can be seen easily. FIG. 11 is a sectional view of the entire image reading apparatus 31 cut at a position passing through the motor 5, and FIG. 12 is a cross-sectional view of the entire image reading apparatus 31 cut at a position passing through the control board 23. The image reading apparatus 31 includes the above-described image read unit 33 and a printer unit 51 disposed on the opposite side of the document glass plate 2 of the image read unit 33. The printer unit 51 includes a sheet cassette 52 configured to store a sheet placed at the bottom, and a sheet conveyance path A configured to deliver sheets one by one from the sheet cassette 52 and conveys the sheet to a printer unit 51 including the print head 119 illustrated in FIG. 3. The printer unit 51 also includes a sheet conveyance path B for taking sheets one by one from a sheet feed tray 53 arranged on the back and conveying the sheet to the printer unit 51. Above the sheet conveyance paths A and B, that is, between the sheet conveyance paths A and B, and the image read unit 33, there exists a space C in which parts are not disposed. In the present exemplary embodiment, the lower housing unit 1a that houses the lower portion of the drive unit such as the motor 5 is disposed in the space C above the sheet conveyance paths A and B. In this way, the height of the entire image reading apparatus 31 can be reduced without being largely affected by the thickness of the motor 5. Further, the space C has a wide width which is approximately the same as those of the sheet conveyance paths A and B, and the drive unit of the image read unit 33 can be disposed freely within the wide space C. Accordingly, a position of the drive unit of the image read unit 33 can be arbitrarily selected, and the flexibility of design is high.

As illustrated in FIG. 10, the control board 23 configured to control the entire image reading apparatus 31 is disposed horizontally (parallel to the document platen) in the space C above the sheet conveyance paths A and B. An end of the control board 23 is positioned at an end of a main body of the apparatus, and an interface connector 23a is provided at the end. With this configuration, the height of the entire image reading apparatus 31 can be reduced without being largely affected by the thickness of the control board 23, which greatly contributes to size reduction of the apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-149982, filed Jul. 29, 2016, which is hereby incorporated by reference herein in its entirety.

What is claimed is:

1. An image reading apparatus comprising:
   a document platen on which an original document is placed;
   a sensor unit extending in a first direction and configured to read the original document while moving in a second direction orthogonal to the first direction;
   a first driven pulley and a second driven pulley disposed apart from each other in the second direction;
   a third driven pulley disposed between the first driven pulley and the second driven pulley in the second direction;
   a drive pulley disposed in such a manner that a rotation center of the drive pulley is farther away from a rotation center of the first driven pulley than a rotation center of the third driven pulley in the first direction and that a distance between the rotation center of the drive pulley and the rotation center of the first driven pulley is greater than or equal to a distance between the rotation center of the third driven pulley and the rotation center of the first driven pulley in the second direction;
   a belt to which the sensor unit is attached and that is wound around the first driven pulley, the drive pulley, the third driven pulley, and the second driven pulley in this order; and
   a motor fixed to the apparatus and configured to drive the drive pulley,
   wherein the belt is bent at positions where each of the first driven pulley, the second driven pulley, and the drive pulley contacts an inner surface of the belt and is bent at a position where the third driven pulley contacts an outer surface of the belt.

2. The image reading apparatus according to claim 1, wherein, when viewed from above, the belt has a pair of inter-vehicle portions extending between the first driven pulley and the second driven pulley,
   wherein one of the pair of the inter-vehicle portions linearly extends between the first driven pulley and the second driven pulley, and
   wherein another of the pair of the inter-vehicle portion is bent at positions where the drive pulley and the third driven pulley contact the other of the pair of the inter-vehicle portion.

3. The image reading apparatus according to claim 1, wherein, when viewed from above, the belt is bent substantially in a zigzag shape between the drive pulley and the third driven pulley.

4. The image reading apparatus according to claim 1, wherein, when viewed from above, the motor, the drive pulley, and the third driven pulley are positioned in one half of a scan area of the sensor unit.

5. The image reading apparatus according to claim 1, wherein a motor shaft of the motor is disposed in such a manner that a direction of the motor shaft is parallel to the document platen and inclined to the second direction.

6. The image reading apparatus according to claim 5, wherein, when viewed from above, a relative angular difference between the direction of the motor shaft and a line connecting the rotation center of the first driven pulley and the rotation center of the drive pulley is 30 degrees or less.

7. The image reading apparatus according to claim 5,
wherein a gear is attached to one end side of the motor shaft and disposed between the third driven pulley and the drive pulley, and configured to transmit driving force to the drive pulley, and
wherein a code wheel of an encoder is attached to another end side of the motor shaft.

8. The image reading apparatus according to claim 1, further comprising a cover configured to cover a portion of the motor facing the document platen.

9. The image reading apparatus according to claim 1, further comprising a flexible flat cable connected to the sensor unit and configured to move, according to movement of the sensor unit, between a glass plate of the document platen, and the motor and the drive pulley without contacting the motor and the drive pulley.

10. The image reading apparatus according to claim 9, wherein the flexible flat cable is disposed to be perpendicular in a width direction thereof to the document platen, and configured to be folded in two in the width direction.

11. The image reading apparatus according to claim 1,
wherein a printer unit is provided below the document platen,
wherein a part of the motor projects to a side of the printer unit, and
wherein a control board configured to control the apparatus is horizontally disposed at a position where the control board does not interfere with the motor.

\* \* \* \* \*